(12) United States Patent
Bismuth et al.

(10) Patent No.: US 8,948,486 B2
(45) Date of Patent: Feb. 3, 2015

(54) METHOD TO PROCESS RADIOLOGICAL IMAGES

(75) Inventors: Vincent Bismuth, Buc (FR); Regis Vaillant, Buc (FR)

(73) Assignee: General Electric Company, Schenectady, NY (US)

( * ) Notice: Subject to any disclaimer, the term of this patent is extended or adjusted under 35 U.S.C. 154(b) by 752 days.

(21) Appl. No.: 13/087,511

(22) Filed: Apr. 15, 2011

(65) Prior Publication Data
US 2011/0268340 A1  Nov. 3, 2011

(30) Foreign Application Priority Data
Apr. 29, 2010  (FR) ..................................... 10 53298

(51) Int. Cl.
| | | |
|---|---|---|
| G06K 9/00 | (2006.01) | |
| G06T 7/20 | (2006.01) | |
| H04N 5/325 | (2006.01) | |
| A61M 25/00 | (2006.01) | |
| A61F 2/95 | (2013.01) | |
| G06T 7/00 | (2006.01) | |

(52) U.S. Cl.
CPC ..... *G06T 7/0024* (2013.01); *G06T 2207/30101* (2013.01)
USPC ........... 382/132; 382/128; 382/130; 382/131; 382/181; 382/203; 382/275; 382/282

(58) Field of Classification Search
CPC ... G06T 7/0012; G06T 7/0079; G06T 7/0097; G06T 7/0089; G06T 11/003; G06T 11/008; G06T 2207/10081; G06T 2207/10116; G06K 9/36; G06K 9/4633; G06K 9/6277; H04N 5/325; A61M 25/104; A61F 2/95
USPC ......... 382/132, 128, 130, 131, 181, 203, 275, 382/282
See application file for complete search history.

(56) References Cited

U.S. PATENT DOCUMENTS

| | | | | |
|---|---|---|---|---|
| 6,404,843 | B1 | 6/2002 | Vaillant | |
| 6,532,380 | B1 * | 3/2003 | Close et al. | 600/431 |
| 7,415,169 | B2 * | 8/2008 | Florent et al. | 382/294 |
| 7,991,453 | B2 * | 8/2011 | Florent et al. | 600/425 |
| 8,094,904 | B2 * | 1/2012 | Slabaugh et al. | 382/130 |

(Continued)

OTHER PUBLICATIONS

"Stentvitz, an Innovative Visualization Tool for Assessing Stent Positioning, Spotlighted by GE Healthcare AT TCT 2009." Sep. 24, 2009: n. page. Web. Nov. 18, 2013. <http://www.genewscenter.com/content/detail.aspx?ReleaseID=8465&NewsAreaID=2.*

(Continued)

*Primary Examiner* — Michael A Newman
(74) *Attorney, Agent, or Firm* — GE Global Patent Operation; Marc A. Vivenzo

(57) ABSTRACT

A method to process radiological images is provided. The method comprises partitioning a radiological image of a region to be treated into a superimposition of layers, the region to be treated comprising at least one first structure and a second structure, wherein one layer solely comprises part of the first structure to be isolated from the remainder of the image, the layer solely comprising that part of the first structure to be isolated from the remainder of the image being determined by means of a parametric model of the first structure. The method further comprises determining an image of the region to be treated from the layering thus obtained, in which the isolated part of the first structure is omitted.

9 Claims, 3 Drawing Sheets

(56) References Cited

U.S. PATENT DOCUMENTS

| | | | |
|---|---|---|---|
| 2008/0013819 A1* | 1/2008 | Eilbert et al. | 382/141 |
| 2008/0154122 A1* | 6/2008 | Vaillant et al. | 600/424 |
| 2008/0267475 A1 | 10/2008 | Lendl | |
| 2009/0088830 A1 | 4/2009 | Mohamed et al. | |
| 2009/0220132 A1 | 9/2009 | Trousset | |
| 2011/0123084 A1* | 5/2011 | Sebok | 382/132 |

OTHER PUBLICATIONS

Stentviz an Innovative Visualization Tool for Assessing Stent Positioning, Spotlighted by GE Healthcare AT TCT 2009. Sep. 24, 2009: n. page. Web. Nov. 18, 2013. <http://www.genewscenter.com/content/detail.aspx?ReleaseID=8465&NewsAreaID=2.*

Maximilian Baust, et al; "Stent Graft Removal for Improving 2D-3D Registration."Biomedical Imaging:From Nano to Macro, 2009. ISBI '09. IEEE International Symposium on, IEEE, Piscataway, NJ, USA, Jun. 28, 2009, pp. 1203-1206, XP031502269. ISBN:978-1-4244-3931-7.

Vincent Bismuth, et al; "Elastic Registration for Stent Enhancement in X-Ray Image Sequences." 15th IEEE International Conference on Image Processing (ICIP 2008), Oct. 12, 2008-Oct. 15, 2008, pp. 2400-2403, XP002605529 DOI: 10.1109/ICIP. 2008.4712276.

Adrian Barbu, Vassilis Athitsos, Bogdan Georgescu, Stefan Böhmn Peter Durlak, Dorin Comaniciu "Hierarchical Learning of Curves Application to Guidewire Localization in Fluoroscopy", 2007 IEEE Computer Society Conference on Computer Vision and Pattern recognition (CVPR 2007), Jun. 18-23, 2007, Minneapolis, Minnesota, USA, IEEE Computer Society 2007.

Close RA, Abbey CK, Whiting JS, "Improved localization of coronary stents using layer decomposition", Comput Aided Surg. 2002;7(2):84-9.

Auvray, V., Bouthemy, P., and Liénard, J. "Joint motion estimation and layer segmentation in transparent image sequence: application to noise reduction in X-ray image sequences." EURASIP J. Adv. Signal Process 2009 (Jan. 2009), 1-21.

B. Sarel, M. Irani, "Separating transparent layers through layer information exchange," Proc. IEEE Eur. Conf. Comput. Vis., 328-341, 2004.

Bernard Sarel , Michal Irani, "Separating Transparent Layers of Repetitive Dynamic Behaviors," Proceedings of the Tenth IEEE International Conference on Computer Vision (ICCV'05) vol. 1, p. 26-32, Oct. 17-20, 2005.

French INPI Search Report application No. 1053298 dated Dec. 14, 2010, pp. 1-3.

* cited by examiner

METHOD TO PROCESS RADIOLOGICAL IMAGES

BACKGROUND OF THE INVENTION

1. Field of the Invention

Embodiments of the present invention relate to the field of medical imaging, and more particularly to the field of radiology.

2. Description of the Prior Art

Vascular interventional radiology includes procedures conducted under monitoring by imaging, and notably allows the treatment of arteriosclerosis.

Arteriosclerosis causes local narrowing of the diameter of a vessel and also causes obstruction of the vessel, which hinders the circulating blood flow. Angioplasty consists of deploying an inflatable balloon at the point of narrowing for the purpose of widening the diameter of the vessel. An endovascular prosthesis (or stent) can also be implanted in the vessel to keep the vessel open.

During angioplasty procedure, the surgeon inserts a guide wire into the vessel to bring a catheter carrying the inflatable balloon or stent as far as the narrowed region. The surgeon must position the stent at a precise point.

To monitor conducting of the procedure, the surgeon visualizes a radiological image of the treated region. The radiological image is an image acquired in real time, which enables the surgeon to visualize the positioning of the different instruments used in the region to be treated.

In order to be able to control the positioning of the prosthesis in the region to be treated, the surgeon must have an image available in which the stent can be visualized. Yet in the image obtained after deployment of the stent, the guide wire is superimposed over the stent. Therefore, the presence of the guide wire hampers visualization of the stent. However this guide wire must remain in place until the end of the procedure for medical reasons.

Because the stent is a thin mesh having very low contrast compared with the remainder of the image, and since the guide wire has greater contrast, the guide wire may mask some parts of the stent which are of interest to the surgeon. Therefore, for the surgeon to have access to a maximum amount of information, the guide wire needs to be deleted so that only the stent is seen in the region to be treated.

Techniques are known which allow objects in an image to be removed without impairing the visual aspect of the image. These techniques are known as inpainting. However, these techniques proceed by interpolating the image around the object to reconstruct the removed part. This technique results in a loss of information which is incompatible with diagnosis in the medical sphere.

SUMMARY OF THE INVENTION

According to one embodiment of the present invention, method to process radiological images is provided. The method comprises partitioning a radiological image of a region to be treated into a superimposition of layers, the region to be treated comprising at least one first structure and a second structure, wherein one layer solely comprises part of the first structure to be isolated from the remainder of the image, the layer solely comprising that part of the first structure to be isolated from the remainder of the image being determined by means of a parametric model of the first structure. The method further comprises determining an image of the region to be treated from the layering thus obtained, in which the isolated part of the first structure is omitted.

According to an alternate embodiment of the present invention, a medical imaging system is provided. The medical imaging system comprises: a source configured to emit a beam of rays; a detector positioned facing the source and configured to detect the rays emitted by the source; a support positioned between the source and the detector; a storage unit; an interface unit; and a processing unit. The processing unit it configured to: partition a radiological image of a region to be treated into a superimposition of layers, the region to be treated comprising at least one first structure and a second structure, wherein one layer solely comprises part of the first structure to be isolated from the remainder of the image, the layer solely comprising that part of the first structure to be isolated from the remainder of the image being determined by means of a parametric model of the first structure; and determine an image of the region to be treated from the layering thus obtained, in which the isolated part of the first structure is omitted.

BRIEF DESCRIPTION OF THE DRAWINGS

Other characteristics and advantages will become further apparent from the following description which is solely illustrative and non-limiting and is to be read with reference to the appended drawings in which.

DETAILED DESCRIPTION OF THE INVENTION

Figure 1:
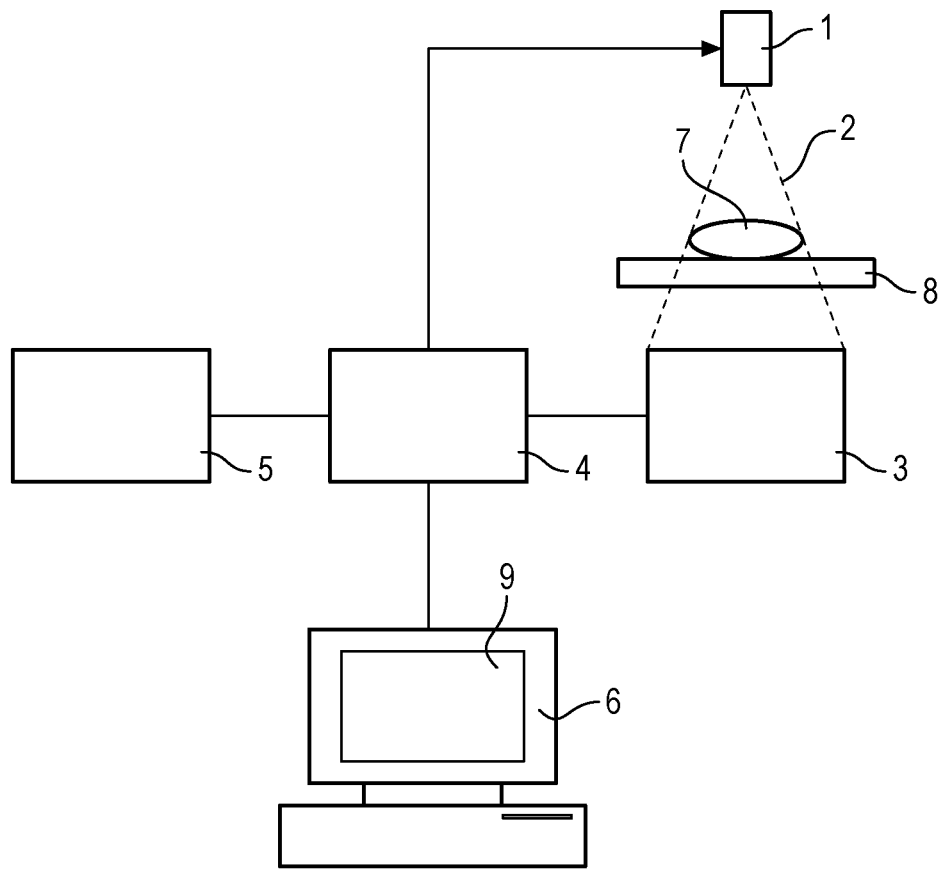
FIG. 1 illustrates a medical imaging system according to an embodiment of the present invention.

In FIG. 1, the radiological imaging equipment comprises a source 1 able to emit a beam 2 of X-rays, a detector 3 arranged facing the source 1 and configured to detect the rays emitted by the source 1, a support 8 arranged between the source 1 and the detector 3, a processing unit 4, a storage unit 5 and an interface unit 6.

The support 8 is intended to receive a patient 7 in whom the surgeon is to conduct a procedure such as an angioplasty to treat atherosclerosis.

The processing unit 4 is configured to control the emission of X-rays by the source 1 and movement of the source 1 relative to the detector 3.

Also, the processing unit 4 is configured to command reading of an image by the detector 3 and to receive data acquired by the detector 3.

The processing unit 4 is for example one or more computers, one or more processors, one or more microcontrollers, one or more micro-computers, one or more programmable logic controllers, one or more application-specific integrated circuits, other programmable circuits, or other devices which include a computer such as a work station.

The processing unit 4 is coupled with the storage means 5 which may be integrated in or separate from the processing unit 4. These means can be formed of a hard disk or any other removable storage means (CD-ROM, disk, etc.). These storage means 5 can be used to store an acquired or processed radiological image of the region to be treated. They may be a ROM/RAM memory of the processing unit 4, a CD-ROM, USB key, memory of a central server. The processing unit 4 may comprise a reading device (not shown) e.g. a disk drive or CD-ROM drive, to read the instructions of a method to process radiological images (described below) from an instruction medium (not shown) such as a floppy disk or CD-ROM. As a variant, the processing unit 4 executes the instructions of the processing method (described below) stored in firmware (not shown).

The interface unit 6 comprises a display device 9. The interface unit 6 provides the surgeon with means to control the procedure.

More precisely, during procedure, the surgeon is able to see the vascular structures of the operated region on the display device 9.

The display device 9 is for example a computer screen, a monitor, flat screen, plasma screen or any commercially available display device. The display device 9 enables the surgeon to visualize the vascular structures of the operated region.

Figure 2:
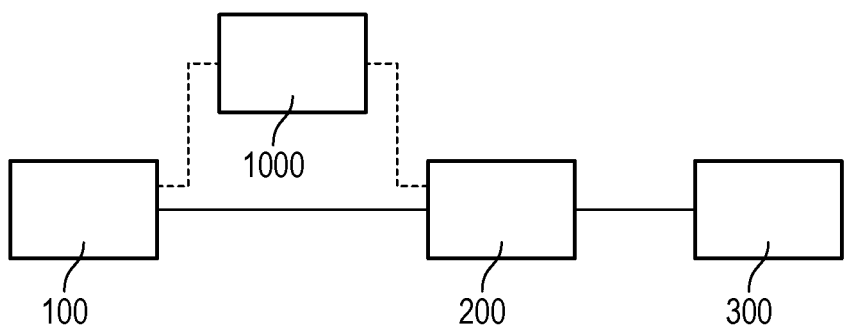
FIG. 2 schematically illustrates a method according to an embodiment of the present invention.

FIG. 2 schematically illustrates a method according to an embodiment of the present invention.

The image processing method uses the principle that a radiological image by nature is transparent, and that it can be modelled as a superimposition of several layers.

A "layer" is a plane in which each pixel of the plane corresponds to an absorbance value μ such that:

$$\mu = \log\left(\frac{I_0}{I}\right)$$

in which $I_0$ is the intensity of the transmitted X-ray beam and in which I is the intensity of the X-ray beam incident to the layer under consideration.

Figure 3:
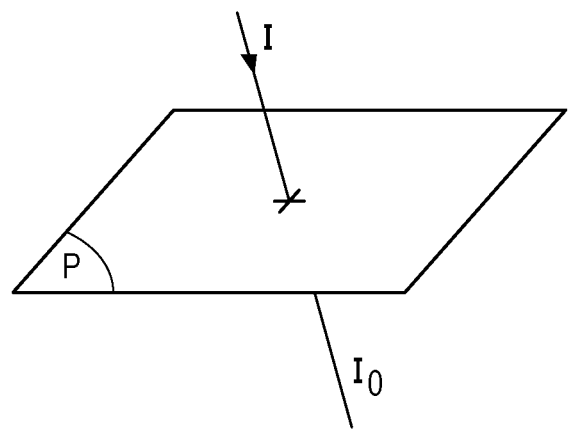
FIG. 3 schematically illustrates a layer P according to an embodiment of the present invention.

FIG. 3 schematically illustrates a layer P with the incident beam I and transmitted beam $I_0$.

Starting with the assumption that it is possible to model a radiological image by superimposing several layers, for each pixel, the intensity of the beam transmitted by all the layers is expressed according to Beer-Lambert's law, given by:

$$I_{image} = I \cdot e^{-\Sigma_i \mu_i}$$

in which I is the intensity of incident X-ray beam, $I_{image}$ is the intensity of the X-ray beam after passing through each layer i, and in which $\mu_i$ is absorbance.

Figure 4:
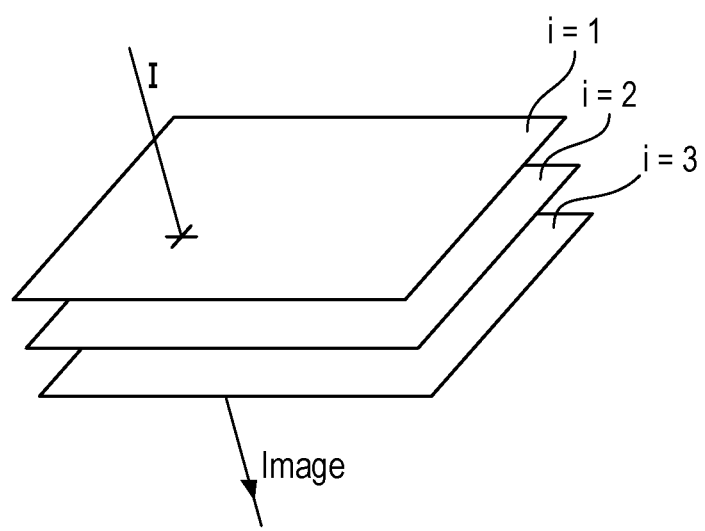
FIG. 4 schematically illustrates a superimposition of three layers which model an image of a region to be treated according to an embodiment of the present invention.

FIG. 4 schematically illustrates the superimposition of three layers which model an image of the region to be treated.

If the radiological image is the image of a region to be treated comprising at least one instrument and a vascular prosthesis, the X-rays will pass through the instrument and prosthesis so that each pixel of the radiological image comprises all the data relating to the region to be treated.

Figure 5:
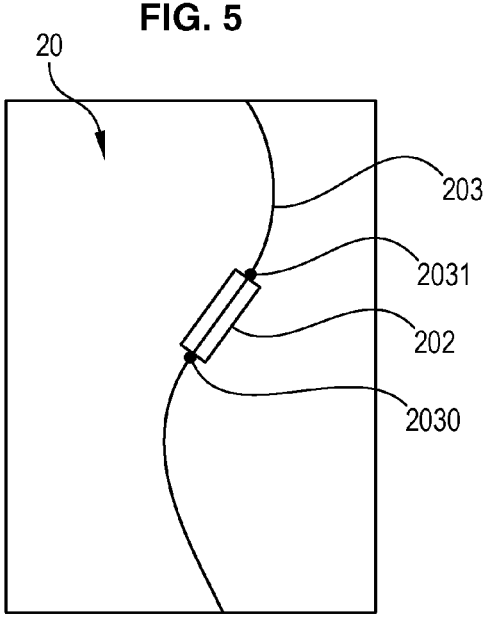
FIG. 5 schematically depicts a radiological image of a region to be treated according to an embodiment of the present invention.

FIG. 5 schematically illustrates a radiological image of a region to be treated. This image 20 comprises a stent 202, a guide wire 203 and markers 2030, 2031. These markers 2030, 2031 are respectively arranged at the two ends of the stent 202 and allow easy identification of the stent 202 in the image 20.

It is to be noted that the blood vessel in which the stent, the guide wire 203 and the markers 2030, 2031 are located, has radiation absorption properties which are similar to those of the surrounding tissues. Thus, it does not generate any contrast in the image and is consequently invisible in the radiological image.

The method to process radiological images described herein sets out to omit part of the guide wire 203. This part of the guide wire 203 is the part located between the markers 2030, 2031 i.e. inside the stent 202. Similarly, it would also be possible to omit any other part, or the entirety of the guide.

During an initial step 100, the radiological image 20 of the region to be treated is acquired, then during a second step 200 the acquired radiological image is broken down into a superimposition of layers, one layer solely comprising that part of the instrument to be isolated from the remainder of the image.

More generally, the radiological image processed here can be derived from a sequence of previously acquired and recorded radiological images, or it can be derived from the combining together of several images e.g. thirty images.

Figure 6:
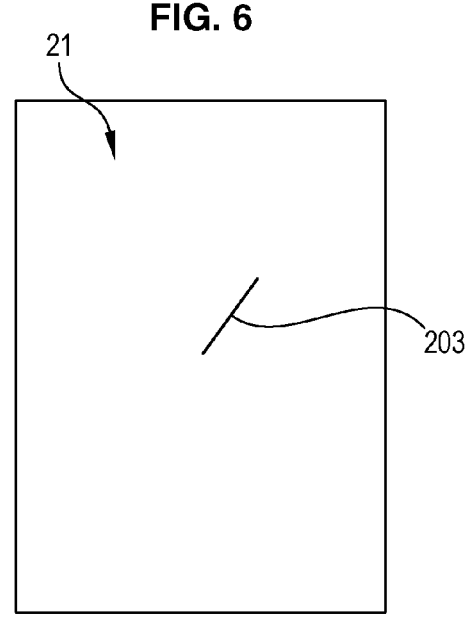
FIG. 6 schematically illustrates a layer estimated in accordance with an embodiment of the present invention.

FIG. 6 illustrates layer 21 with that part of the guide wire 203 arranged between the two markers 2030, 2031 isolated from the remainder of the image 20.

Once this layer modelling has been obtained, during a third step 300 the layer 21 comprising the instrument isolated from the remainder of the image is removed from the radiological image 20 of the region to be treated.

This leads to obtaining the image 22 of the region to be treated in which the portion of instrument has been removed.

Figure 7:
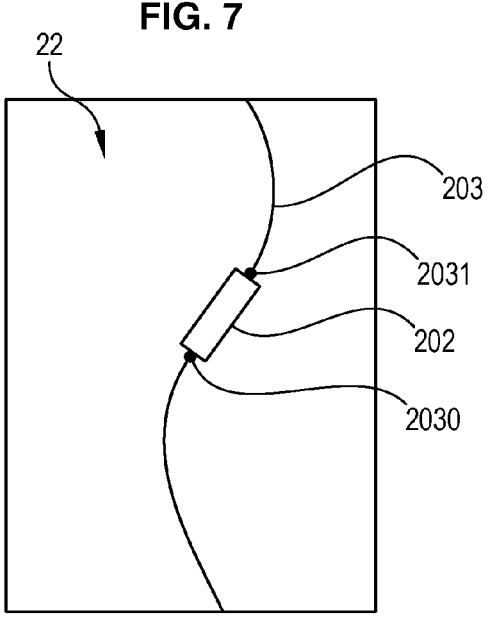
FIG. 7 schematically illustrates the image of the region to be treated, in which the portion of guide wire has been removed, according to an embodiment of the present invention.

FIG. 7 illustrates the image 22 of the region to be treated in which the portion of instrument located between the two markers 2030, 2031 is deleted.

Therefore visualization of the stent 202 is no longer impaired by the presence of the guide wire 203.

In addition, taking into account that the radiological image of the region to be treated is transparent, with said method no data is lost notably around the region in which part of the guide wire 203 is deleted.

The layered modelling of the acquired image is made possible since a layer can be described as per a parametric model.

A description is given below of the estimation of the layer solely comprising the portion of guide wire 203 that it is desired to delete.

To estimate the layer comprising the part of guide wire 203 to be deleted, a parametric model is used of the layer to be estimated.

Said layer (its intensity mapping) is mathematically described by the function $f(p)$ in which p is a parameter vector and $f$ is the function allowing intensity values to be obtained which describe the layer, having knowledge of p. To estimate p from the image, several known estimation techniques can be used such as the Maximum a Posteriori technique—MAP.

Figure 8:
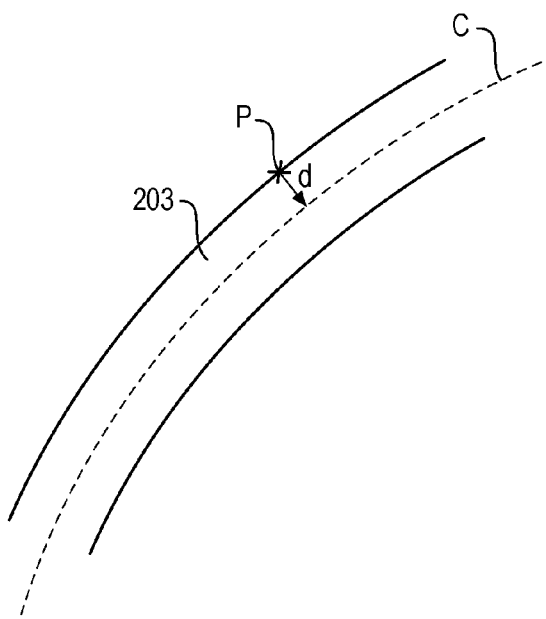
FIG. 8 is a diagram of the guide wire according to an embodiment of the present invention.

FIG. 8 illustrates the guide wire of the layer to be estimated.

The layer is defined as a parametric image $f(p)$ with p=[c, profile] in which c is the central line of all the pixels defining the guide wire 203 and profile is a function which, at a distance d, associates the value of the guide wire 203 for every pixel at this distance d from the central line c.

It is assumed here that the value of the pixels of the guide wire only depends on the distance to the central line c.

To determine the curve c describing the guide wire 203, it is possible to use several known techniques such as the one described in document: Adrian Barbu, Vassilis Athitsos, Bogdan Georgescu, Stefan Böhmn Peter Durlak, Dorin Comaniciu *"Hierarchical Learning of Curves Application to Guidewire Localization in Fluoroscopy"*, 2007 IEEE Computer Society Conference on Computer Vision and Pattern recognition (CVPR 2007), 18-23 Jun. 2007, Minneapolis, Minn., USA, IEEE Computer Society 2007.

Once the central line c of the guide wire 203 has been estimated, it is possible to determine profile(d) as follows.

It is to be noted that before performing the estimation properly so-called, it is possible to conduct a step 1000 to pre-process the acquired image so as to eliminate the image component corresponding to its background i.e. to structures of much greater extent than the structures of interest, namely the stent 202 and guide wire 203.

This pre-processing step 1000 consists of estimating the background of the image using low-pass filtering or using a mathematical morphology approach of known type.

Once the image background has been estimated, this is subtracted from the acquired image using logarithmic subtraction. This can also be considered as the estimation and subtraction of a layer of the image formed by the background.

In the resulting image, the value of the pixels of this image is proportional to the absorbance of the thin structures such as the guide wire 203 and the stent 202.

Consideration is given to the pixels at a distance d from the central line c, and a value is determined which represents all these pixels, such as their mean or median. Therefore, with knowledge of c and profile(d) the values of the pixels $p_i$ are obtained which correspond to the guide wire 203.

The layer containing the portion of guide wire 203 to be deleted is finally subtracted from the image 20 of the region to be treated. It is a logarithmic subtraction.

Embodiments of the present invention enable the acquisition of a radiological image of a region to be treated using a prosthesis and an instrument, in which the instrument is omitted from the image, wherein the obtained image is able to be used for diagnosis purposes. Embodiments of the present invention simplify the acquisition using a single image, by describing one of the layers using a parametric model that can be estimated from the acquired image. Embodiments of the present invention enable the practitioner to obtain all necessary information for the procedure, and is easy to implement with known imaging systems.

What is claimed is:

1. A method to process radiological images, the method comprising:
    partitioning a radiological image of a region to be treated into a superimposition of layers, the region to be treated comprising at least one first structure and a second structure,
    wherein the first structure is an instrument and wherein the second structure is a vascular prosthesis and the structures associated with a vessel,
    wherein one layer solely comprises part of the first structure to be isolated from the remainder of the image, the layer solely comprising that part of the first structure to be isolated from the remainder of the image being determined by means of a parametric model of the first structure, wherein the parametric model of the first structure is at least a function of a distance to a central line or to a centre of the first structure; and
    determining an image of the region to be treated from the layering thus obtained, in which the isolated part of the first structure is omitted.

2. The method according to claim 1, wherein the determining an image of the region to be treated further comprises subtracting the layer which comprises the part to be isolated from the remainder of the image from the radiological image of the region to be treated, so as to obtain an image of the region to be treated in which the isolated part of the first structure is omitted.

3. The method according to claim 1, further comprising pre-processing the acquired image, so as to remove a background component of the radiological image.

4. The method according to claim 3, wherein pre-processing the acquired image comprises filtering the acquired image using a low-pass filter or morphological filter.

5. The method according to claim 1, wherein the radiological image of the region to be treated depicts a vascular structure.

6. The method according to claim 1, wherein the instrument is a guide wire or catheter, wherein the vascular prosthesis is a stent, and wherein the structures associated with the vessel are calcifications.

7. The method according claim 1, further comprising displaying the radiological image of the region to be treated in which the isolated part of the first structure is omitted.

8. The method according to claim 1, wherein the radiological image is derived from a sequence of radiological images previously acquired and recorded.

9. A medical imaging system comprising:
    a source configured to emit a beam of rays;
    a detector positioned facing the source and configured to detect the rays emitted by the source;
    a support positioned between the source and the detector;
    a storage unit;
    an interface unit; and
    a processing unit configured to:
        partition a radiological image of a region to be treated into a superimposition of layers, the region to be treated comprising at least one first structure and a second structure,
        wherein the first structure is an instrument and wherein the second structure is a vascular prosthesis and the structures associated with a vessel,
        wherein one layer solely comprises part of the first structure to be isolated from the remainder of the image, the layer solely comprising that part of the first structure to be isolated from the remainder of the image being determined by means of a parametric model of the first structure, wherein the parametric model of the first structure is at least a function of a distance to a central line or to a centre of the first structure; and
        determine an image of the region to be treated from the layering thus obtained, in which the isolated part of the first structure is omitted.

* * * * *